Aug. 26, 1930.  A. O. AUSTIN  1,773,714
CABLE JOINT
Filed Aug. 5, 1926  2 Sheets-Sheet 1

Inventor
Archie O. Austin
By Nissens Crane
Attorneys

Patented Aug. 26, 1930

1,773,714

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

CABLE JOINT

Application filed August 5, 1926. Serial No. 127,437.

This invention relates to means for joining the ends of conductor cables, and has for its object the provision of a cable joint which shall be simple and convenient to install and which shall have as high a degree of efficiency as the unbroken cable.

The invention is exemplified in the combination and arrangement of parts shown in the accompanying drawings and described in the following specification and it is more particularly pointed out in the appended claims.

Figure 1:
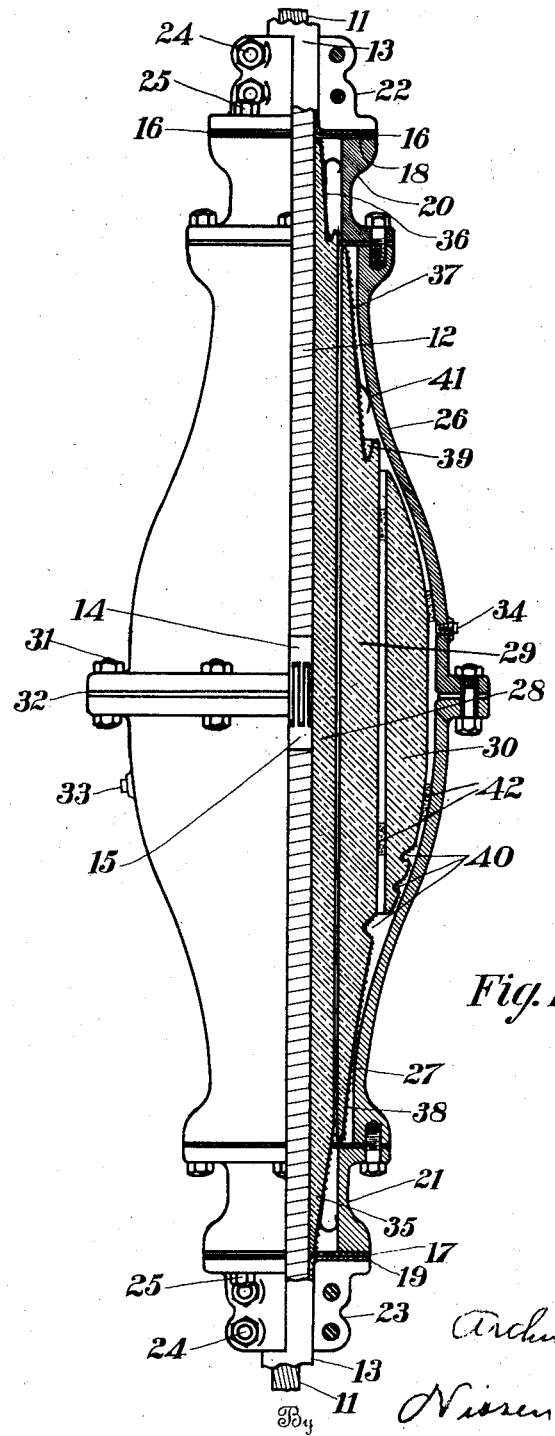
Fig. 1 is a part elevation and part section showing a cable joint embodying one form of the present invention.

In making high voltage cable installations, considerable difficulty is encountered in making up suitable joints where the ends of the cable are spliced together. To obviate this difficulty and to develop the dielectric strength of the cable, I have invented a new and improved joint which is simple to make, easily installed and takes up the electrostatic stress gradually so that the full strength of the cable may be developed if desired, the joint being no weaker than the rest of the cable. The cable consists essentially of a conductor 11 covered by a layer of insulation 12 which is usually varnished cambric or paper, and a lead sheath 13. The lead sheath is stripped from the ends of the cable which it is desired to join and complementary members 14 and 15 sweated or attached to the two ends of the cable 11. The lead sheath may then be flared or flanged as at 16 and 17. Gaskets 18 and 19 may then be placed and the collars 20 and 21 clamped to the end flanges 22 and 23. The end flanges may be also tightened to the lead sheath by the bolts 24. The gasket 18 may be placed between the lead sheath and the coupling flange 20 as shown at the left in the drawing, or between the clamping collar 23 and the lead sheath 17 as shown at the other end. The lead sheath is then clamped up tightly by the bolts or cap screws 25. The bells 26 and 27 may then be bolted to the end pieces. The cylindrical insulating members 28, 29 and 30 may then be slipped over one end of the cable. These members may be made of porcelain or other dielectric material having a higher dielectric flux constant than the insulating covering 12. The cable with the complementary members 14 and 15 is then shoved up together and the two parts clamped together by the bolts 31 and the gasket 32. The intervening space may be filled by removing plugs 33 and 34 and, if desired, an expansion chamber may replace the plug 34. Where a hollow conductor is used it may permit the escape of filling material through the space between the complementary members 14 and 15.

Made up in the manner shown the joint may be readily adapted for a variety of different sizes of conductors by changing the member 28 together with the end flanges 22 and 23. The cylindrical member 28 has metallized tapered surfaces 35 and 36 which pick up the electrical stress gradually and prevent discharge along the insulated wrapping covering the conductor. The discharge between joints of successive baffles is prevented by tapered surfaces 37 and 38 as well as control pockets 39 or circumferential grooves 40. Electrical contact between the metallized surfaces may be made by springs 41 or other suitable means. If desired, a resilient material such as cork 42 may be placed between successive baffles and between the baffles and the outside metal jacket to properly space the baffles and to prevent breakage. In other cases a layer of insulating material such as paper or varnished cambric may be used.

Figure 2:
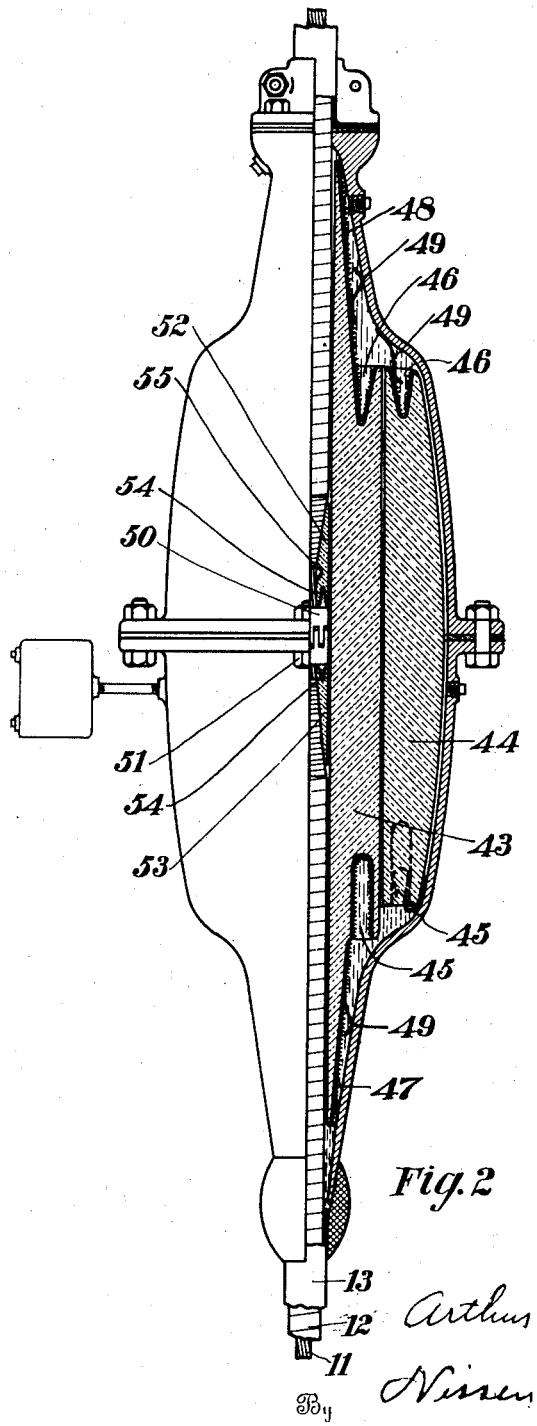
Fig. 2 is a view similar to Fig. 1, showing a modified form of the invention.

A slightly different form of the invention is shown in Fig. 2. In this case the insulated members 43 and 44 have insulated control pockets 45 and 46 to prevent discharge along the joint between the members 43 and 44. The insulating member adjacent the cable has metallized tapered ends 47 and 48 which are in electrical contact with the sheath and end members and bells or jackets through springs 49.

In order to facilitate construction and to eliminate the discharge along the inner surface from complementary members 50 and 51, control pieces 52 and 53 are used. These pieces preferably have insulated control pockets and are made of a material such as porcelain which has a higher dielectric flux constant than the insulation covering the conductor. The cable insulation is tapered so that these members are slipped in place before complementary members 50 and 51 are sweated or attached to the conductor. The control pockets 54 as well as the groove 55 are in electrical contact with the conductor or complementary member. This form permits of insulating baffles which are easy to construct. The control pockets 45 may be in the form of a groove or a series of holes placed near together as desired. The joint may be made up with any number of insulating baffles desired to obtain the proper dielectric strength. The length of joint will, of course, depend upon the result desired. The use of a material having a higher dielectric flux constant than the covering of the cable permits of shortening the joint which is usually an advantage.

I claim:

1. The combination with a pair of cables each comprising a conductor, an insulating covering for said conductor and an outer metal sheath, of complementary connecting members secured to the ends of said conductors and engaging each other to electrically connect said conductors, the ends of said sheaths being spaced from said complementary connecting members to expose a portion of the insulating covering for said conductors, and a plurality of preformed, solid dielectric sleeves arranged one within the other disposed about the joint formed by said complementary members and bridging the space between the ends of said sheaths the innermost one of said dielectric sleeves being disposed directly adjacent the insulating covering for said conductors.

2. The combination with a pair of cables each comprising a conductor, an insulating covering and an outer metal sheath, of complementary contact members for joining the ends of said conductors, said metal sheaths being spaced from the ends of said conductors, and a plurality of tubular dielectric members arranged one within the other and surrounding the joint formed by said complementary connectors, the ends of said tubular members being tapered and provided with a metallic covering, said covering being connected with said sheaths and forming a conducting path connected with said sheaths and separated from said conductors by a gradually increasing thickness of dielectric material.

3. The combination with a pair of conductors, of connecting means forming a joint between said conductors and a plurality of tubular dielectric members arranged one within the other and surrounding said joint, said tubular dielectric members having flux control pockets therein adjacent the ends of the openings between the surfaces of said members to prevent discharge along said surfaces.

4. The combination with a pair of cables each comprising a conductor, an insulating covering for said conductor and an outer metal sheath, of connectors forming a joint between the ends of said conductors, the ends of said sheaths being spaced from the said connectors to expose a portion of the insulating covering for said conductors, a plurality of tubular members enclosing said joint and overlapping the exposed insulating covering, the ends of said members being tapered and provided with a conductor covering electrically connected with the ends of said sheaths to form a conductor path continuous with said sheaths and gradually spaced outwardly from said conductor, and insulated flux controls for preventing discharge along the surfaces between said tubular dielectric members.

5. The combination with a pair of cables each comprising a conductor, an insulating covering for said conductor and an outer metal sheath, of contact members secured to the ends of said cables arranged to form electrical connection between said cables when said contact members are moved together longitudinally with said cables, the ends of said sheaths being spaced from said contact members to expose portions of said insulating covering, a plurality of tubular dielectric members disposed one within the other and surrounding said contact members and the exposed portions of said insulating covering and each extending continuously over the joint formed by said contact members, a divided metal housing having opposite portions connected to the ends of said sheaths, and means for securing said portions together to enclose said tubular dielectric members and connect the ends of said sheaths.

6. The combination with a pair of cables arranged end to end, each cable comprising a conductor, an insulating covering for said conductor and an outer metal sheath, of means for forming a joint between the adjacent ends of said conductor, the ends of said sheath being spaced from said joint at opposite sides thereof, a plurality of tubular dielectric members arranged one within the other and surrounding the portions of said cable between the ends of said sheaths, the ends of said tubular dielectric members being tapered, and a two-part metallic housing enclosing said tubular dielectric members, said housing having the ends thereof connected with the ends of said sheath and having the parts thereof secured together to form a closure for the joint between said cables.

7. The combination with a pair of cables each comprising a conductor, an insulating covering for said conductor and an outer metal sheath, of a connector for forming a joint between adjacent ends of said conductor, said sheaths being spaced from said joint at opposite sides thereof, and a covering for said joint comprising a plurality of concentric tubular dielectric members, and a metallic housing enclosing said tubular dielectric members, said housing being divided between the ends thereof and having detachable sleeves at opposite ends thereof for connection with the ends of said sheath.

8. The combination with a pair of cables each comprising a conductor, an insulating covering for said conductor, and an outer metal sheath, of complementary contact members for electrically connecting the ends of said conductor, the ends of said sheaths being spaced from said contact members, concentric tubular dielectric members enclosing the ends of the cables between the ends of said sheaths, a metallic housing enclosing said tubular dielectric members, said housing being divided between the ends thereof, means for clamping the parts of said housing together, detachable sleeves secured to the opposite ends of said housing, and clamping collars for clamping the ends of said sheaths to said detachable sleeves.

9. The combination with a pair of cables each comprising a conductor, an insulating covering surrounding said conductor, and an outer metal sheath, of complementary members for connecting the ends of said conductors, the ends of said sheaths being spaced from the ends of said conductors to expose a portion of the insulating covering for said conductor, a plurality of concentric tubular dielectric members surrounding the portion of the cable between the ends of said sheaths, said dielectric members having the ends thereof tapered, metallized flux controlling members formed in said tubular dielectric members for preventing discharge along the surfaces between said members, a divided housing enclosing said tubular dielectric members, means for clamping the sections of said housing together, and means for clamping the ends of said housing to the ends of said sheaths.

10. The combination with a conductor having an insulating covering provided with a tapered portion adjacent the end of said conductor, of a dielectric sleeve of material having a higher flux constant than the covering for said conductor disposed over the tapered portion of said covering, said sleeve having a pocket therein extending backwardly from the end of said conductor, and conducting material disposed within said pocket and connected with said conductor.

11. In combination, a pair of conductors having insulating covering, of means for connecting the ends of said conductors, the insulating covering adjacent the joint between the ends of said conductor being tapered toward said joint, dielectric sleeves surrounding the tapered portions of said insulating covering and having pockets therein extending away from the joint between the ends of conductors and provided with conducting material within said pockets, and an outer dielectric sleeve enclosing the joint between said conductors and the portion of said conductors adajacent to said joint.

12. The combination with a pair of conductors each having an insulating covering and an outer metal sheath, of means for electrically connecting the ends of said conductors, said sheaths being spaced from the joint between the ends of said conductor, bodies of dielectric material having a higher dielectric flux constant than the insulating covering for said conductors disposed adjacent said joints and having their outer surfaces substantially flush with the outer surface of said dielectric covering, said bodies having flux controls formed therein, a dielectric sleeve surrounding the joint between said conductors and said bodies and having the outer ends thereof tapered, and a metallic covering for said tapered ends connected with said sheaths.

In testimony whereof I have signed my name to this specification on this 30th day of July, A. D. 1926.

ARTHUR O. AUSTIN.